US010787880B2

(12) United States Patent
Wehrenberg

(10) Patent No.: US 10,787,880 B2
(45) Date of Patent: Sep. 29, 2020

(54) METHOD FOR SEALING PERFORATION TUNNELS WITH SWELLING ELASTOMER MATERIAL

(71) Applicant: Steve Wehrenberg, Mustang, OK (US)

(72) Inventor: Steve Wehrenberg, Mustang, OK (US)

(73) Assignee: Steve Wehrenberg, Mustang, OK (US)

( * ) Notice: Subject to any disclaimer, the term of this patent is extended or adjusted under 35 U.S.C. 154(b) by 135 days.

(21) Appl. No.: 16/018,753

(22) Filed: Jun. 26, 2018

(65) Prior Publication Data

US 2018/0371868 A1    Dec. 27, 2018

Related U.S. Application Data

(60) Provisional application No. 62/524,888, filed on Jun. 26, 2017.

(51) Int. Cl.
| | | |
|---|---|---|
| *E21B 33/138* | (2006.01) | |
| *C09K 8/42* | (2006.01) | |
| *C09K 8/44* | (2006.01) | |
| *E21B 47/117* | (2012.01) | |
| *E21B 43/26* | (2006.01) | |

(52) U.S. Cl.
CPC ............ *E21B 33/138* (2013.01); *C09K 8/426* (2013.01); *C09K 8/44* (2013.01); *E21B 47/117* (2020.05); *C09K 2208/08* (2013.01); *E21B 43/26* (2013.01)

(58) Field of Classification Search
CPC .... E21B 33/138; E21B 47/1025; E21B 43/26; C09K 8/426; C09K 8/44; C09K 2208/08
See application file for complete search history.

(56) References Cited

U.S. PATENT DOCUMENTS

| | | |
|---|---|---|
| 3,385,367 A | 5/1968 | Kollsman |
| 4,862,964 A | 9/1989 | George et al. |
| 5,293,938 A | 3/1994 | Onan et al. |
| 5,332,037 A | 7/1994 | Schmidt et al. |
| 7,059,415 B2 | 6/2006 | Bosma et al. |
| 7,128,148 B2 | 10/2006 | Eoff et al. |
| 7,287,586 B2 | 10/2007 | Everett et al. |
| 7,373,991 B2 | 5/2008 | Vaidya et al. |
| 7,520,327 B2 | 4/2009 | Surjaatmadja |
| 7,866,393 B2 | 1/2011 | Badalamenti et al. |
| 8,051,914 B2 | 11/2011 | Freyer |
| 8,235,108 B2 | 8/2012 | Lemme et al. |
| 8,555,961 B2 | 10/2013 | Koloy et al. |

(Continued)

FOREIGN PATENT DOCUMENTS

| | | |
|---|---|---|
| WO | 2015031018 A1 | 3/2015 |
| WO | 2015065384 A1 | 5/2015 |
| WO | 2015105488 A1 | 7/2015 |

OTHER PUBLICATIONS

Search Report and Written Opinion dated Aug. 30, 2018 for PCT/US2018/039479.

*Primary Examiner* — Brad Harcourt
(74) *Attorney, Agent, or Firm* — Crowe & Dunlevy, P.C.

(57) ABSTRACT

A method for sealing perforation tunnels in a well includes steps of pumping an initial volume of fluid into the well, mixing expandable material into a carrier fluid to form an expandable fluid mixture, pumping the expandable fluid mixture into the well to force the expandable material into the perforation tunnels in the well, and holding the expandable material under a hold pressure in the perforation tunnels for a cure period to form perforation plugs.

18 Claims, 4 Drawing Sheets

(56) References Cited

U.S. PATENT DOCUMENTS

| | | |
|---|---|---|
| 8,905,133 B2 | 12/2014 | Potpapenko et al. |
| 9,394,779 B2 | 7/2016 | Nelson |
| 9,464,500 B2 | 10/2016 | Allison et al. |
| 9,567,824 B2 | 2/2017 | Watson et al. |
| 2004/0020662 A1 | 2/2004 | Freyer |
| 2004/0108112 A1* | 6/2004 | Nguyen ............... E21B 33/138 166/285 |
| 2007/0257405 A1 | 11/2007 | Freyer |
| 2010/0212906 A1 | 8/2010 | Fulton et al. |
| 2012/0285692 A1 | 11/2012 | Potapenko et al. |
| 2014/0110119 A1 | 4/2014 | Luyster et al. |
| 2015/0060069 A1 | 3/2015 | Potapenko et al. |
| 2015/0152317 A1 | 6/2015 | Hutchins et al. |
| 2016/0348464 A1* | 12/2016 | Sabins ................. E21B 33/13 |
| 2017/0015824 A1* | 1/2017 | Gozalo ................. C09K 8/44 |

* cited by examiner

METHOD FOR SEALING PERFORATION TUNNELS WITH SWELLING ELASTOMER MATERIAL

RELATED APPLICATIONS

The present application claims the benefit of U.S. Provisional Patent Application No. 62/524,888 filed Jun. 26, 2017 entitled "Method for Sealing Perforation Tunnels with Swelling Elastomer Material," the disclosure of which is herein incorporated by reference.

FIELD OF THE INVENTION

The present invention generally relates to the field of the production of oil and gas from subterranean reservoirs and more specifically, but not by way of limitation, to a method for sealing perforations in a wellbore.

BACKGROUND OF THE INVENTION

During the completion stage of an oil well drilling process, perforations are made in the casing or liner of the well to place the interior of the wellbore in communication with the surrounding geologic formation. The perforations may be made through a variety of methods including using shape charges and perforation guns. Once the casing has been perforated in the desired locations, the remaining steps in well completion process can take place. In certain situations, this may involve a hydraulic fracturing process ("fracking") that will improve the permeability of the formation and increase the rate of recovering hydrocarbons through the well.

In some formations, the production of hydrocarbons from the well quickly decreases following the initial completion. In those wells, the producer may choose to close the well if the decreased production is not economically viable. However, due to the significant costs associated with drilling and completing new wells, there is renewed interest in increasing the production from older wells by conducting a subsequent perforation and hydraulic fracturing operation on a new zone within the producing formation.

To perform a subsequent hydraulic fracturing operation, sometimes referred to as a "refrac," the open perforations must be sealed to prevent the high pressure frac fluid from entering the older perforations. In the past, operators have used bridge plugs to isolate zones within the wellbore during the hydraulic fracturing operation. Although widely accepted, the bridge plugs are expensive and are often removed following the hydraulic fracturing operation. This adds cost and complexity to the process of recompleting a well. In other situations, operators have pressed cement into each perforation. This is also expensive and difficult to control. In yet other situations, operators have pumped thixotropic gels into the perforations to temporarily block fluid from entering those zones. The use of thixotropic gels is expensive and may not provide a suitable solution under elevated fracturing pressures.

In light of the deficiencies in the prior art, there remains a need for an improved system and method for preparing a well for sealing perforations in a wellbore in preparation for a subsequent hydraulic fracturing operation.

SUMMARY OF THE INVENTION

In one embodiment, the present invention includes a method for sealing perforation tunnels in a well includes steps of pumping an initial volume of fluid into the well, mixing expandable material into a carrier fluid to form an expandable fluid mixture, pumping the expandable fluid mixture into the well to force the expandable material into the perforation tunnels in the well, and holding the expandable material under a hold pressure in the perforation tunnels for a cure period to form perforation plugs.

In another embodiment, a method for sealing perforation tunnels in a well includes the steps pumping an initial volume of fluid into the well, mixing expandable material into a carrier fluid to form an expandable fluid mixture, pumping the expandable fluid mixture into the well to force the expandable material into the perforation tunnels in the well, holding the expandable material under a hold pressure in the perforation tunnels for a cure period to form perforation plugs, and performing a static pressure test after the step of holding the expandable material under a hold pressure.

In yet another embodiment, the present invention includes a method for sealing perforation tunnels in a well comprising the steps of pumping an initial volume of fluid into the well, and mixing expandable material into a carrier fluid to form an expandable fluid mixture, wherein the step of mixing expandable material into a carrier fluid further comprises mixing a combination of hydrophilic granules and swellable fibers into the water-based carrier fluid. The method continues with the step of pumping the expandable fluid mixture into the well to force the expandable material into the perforation tunnels in the well, and holding the expandable material under a hold pressure in the perforation tunnels for a cure period to form perforation plugs.

WRITTEN DESCRIPTION

Figure 1:
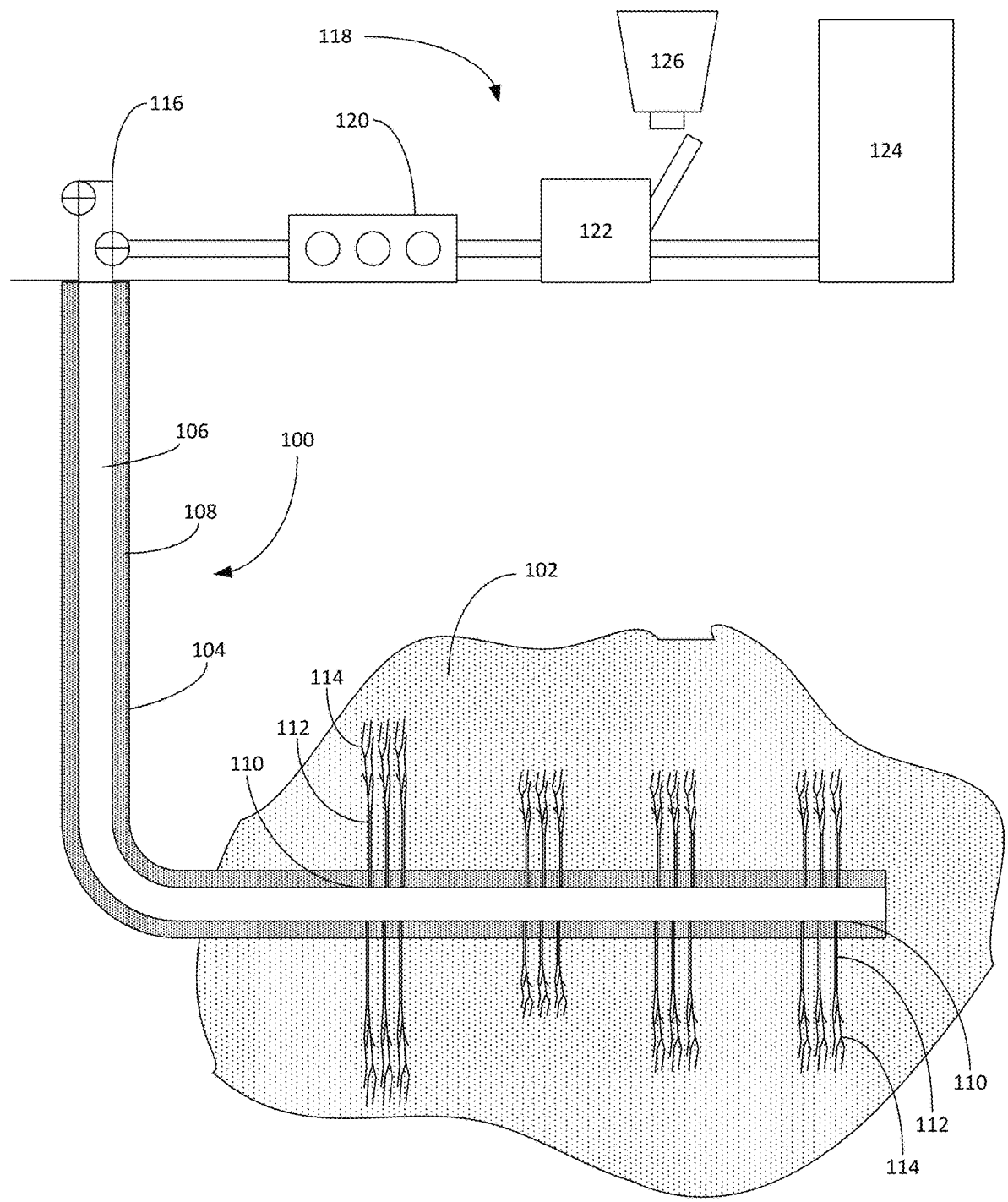
FIG. 1 is a depiction of a well that has been perforated and hydraulically fractured.

Referring first to FIG. 1, shown therein is a cross-sectional depiction of a well 100 that has been drilled in a geologic formation 102 that contains hydrocarbons. As used in this disclosure, the term "hydrocarbons" will include all liquid and gaseous petroleum products. The well 100 includes a wellbore 104 and a casing 106. The well 100 includes cement 108 around the exterior of the casing 106. Although the well 100 is shown as entirely cased and cemented, it will be appreciated that the well 100 may also be an "open-hole" or only partially cased and cemented. Additionally, the well 100 in FIG. 1 is depicted as a horizontal well that includes a vertical section that leads to a lateral section. It will be further appreciated that the system and methods disclosed in this application will find utility in wells that are vertical, deviated or that take other profiles.

As depicted in FIG. 1, the well 100 has been perforated and hydraulically fractured. Perforations 110 have been punched through the casing 106 at desired locations using known perforating techniques. Perforation tunnels 112 extend from the perforations 110 through the cement 108 and into the formation 102. Fractures 114 resulting from the application of high pressure hydraulic fracturing fluid extend into the formation 102 from the perforation tunnels 112. The production of perforations 110, perforation tunnels 112 and hydraulic fractures 114 is well known in the art and the systems and methods disclosed in this application are not limited to the form or configuration of the perforations 110, perforation tunnels 112 and hydraulic fracturing 114 depicted in FIG. 1.

The well 100 further includes a wellhead 116 disposed on top of the casing 106. A perforation sealing system 118 is assembled on the surface and connected to the wellhead 106. The perforation sealing system 118 includes a high pressure pump 120, a blender 122, a fluid source 124 and an expandable material hopper 126. The pump 120 may be a conventional triplex pump that is commonly used in hydraulic fracturing operations. The fluid source 124 is used to supply water-based or oil-based carrier fluids to the blender 122. The blender 122 combines the carrier fluid with the expandable material 128 from the expandable material hopper 126. The blended carrier fluid and expandable material is then provided to the pump 120, where it can be pressurized and delivered into the casing 106 through the wellhead 116. Other configurations of the perforation sealing system 118 are contemplated as falling within the scope of exemplary embodiments. The perforation sealing system 118 is well suited for delivering a slurry or mixture of carrier fluid and expandable material 128 into the well 100.

The expandable material 128 is configured to absorb fluid and swell when exposed to the carrier fluid or fluids in the wellbore. In some embodiments, the expandable material 128 includes small hydrophilic granules 130 that swell when exposed to water-based carrier fluids. The granules 130 may range from about 1 to about 2,000 microns in diameter. In other embodiments, the granules 130 are configured to swell in the presence of hydrocarbons or acidic fluids. In other embodiments, the expandable material 128 includes a combination of granules 130 and swellable fibers 132. In exemplary embodiments, the expandable material 128 swells to many times its original size under well-established, predictable rates of expansion.

The expandable material 128 may be manufactured from suitable compounds, including those listed in the table below:

| Class | Exemplary Products |
|---|---|
| Natural Rubber | SMR, SLR, NAT, SIR, TSR, RSS, Pale Crepe, Neorub |
| Isoprene Rubber | Natsyn, Nipol IR, SKI-3 |
| Butadiene Rubber | Buna CIS, Kuhmo KBR, Buna CB, Europrene Neocis |
| Styrene Butadiene Rubber | Buna SB, Hipren EM, Petroflex SBR, KER |
| Chloroprene | Chloroprene, Neoprene, Baypren |
| Nitrile Rubber | Europrene N, Krynac, Perbunan N/NT, Nipol DN, Nitiriflex N, Kuhmo KNB |
| EPDM Rubber | Keltan, Dutral TER, Nordel IP, Vistalon, Royalene, Nitriflex EP |
| Ethylene Acrylic Rubber | Vamac, Denka AR |
| Butyl Rubber | Butyl |
| Chlorohydrin Rubber | Hydrin, Epichlomer |
| Chlorosulfonated Polyethylene | Hypalon, Toso TS |
| Acrylate Rubber | Hytemp, Noxtite |
| Fluor Rubber | Viton, Fluorel, Technoflon |
| Class | Exemplary Products |
| Silicone Rubber | Silopren, Silastic |

Additional swellable materials suitable for use in connection with the present invention are disclosed in U.S. Pat. Nos. 3,385,367, 7,059,415, 8,051,914 and 9,464,500, the entire disclosures of which are herein incorporated by reference. It will be generally appreciated that any swellable material that swells when placed in contact with any type of fluid may find utility within the scope of exemplary embodiments of the present invention. In certain applications, it may be desirable to manufacture the expandable material 128 such that it degrades in the presence of an acid. This permits the removal of the expandable material 128 through an acidizing operation.

Figure 2:
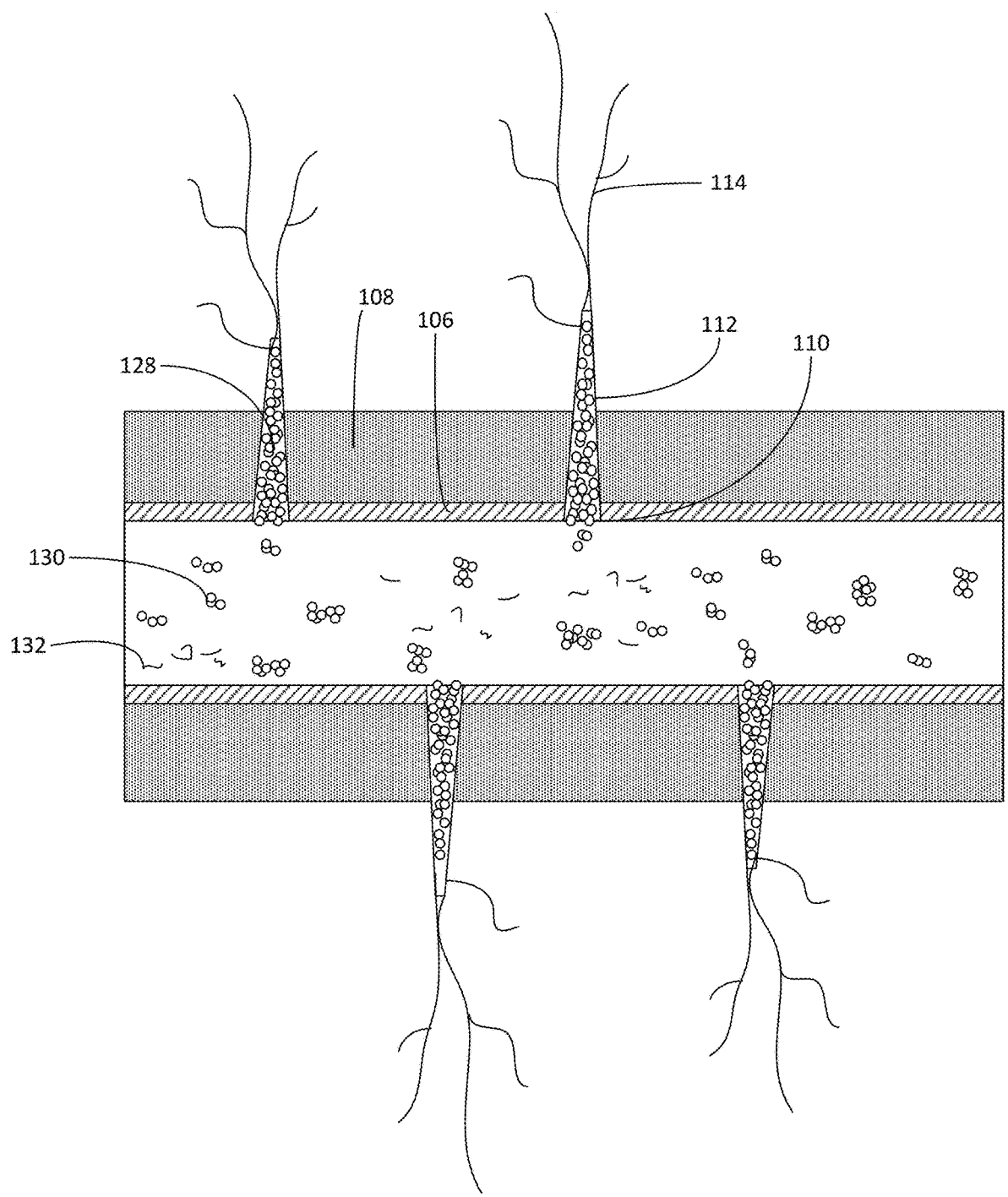
FIG. 2 is a close-up, cross-sectional view of the unexpanded elastomer material entering the perforation tunnels through perforations.
Figure 3:
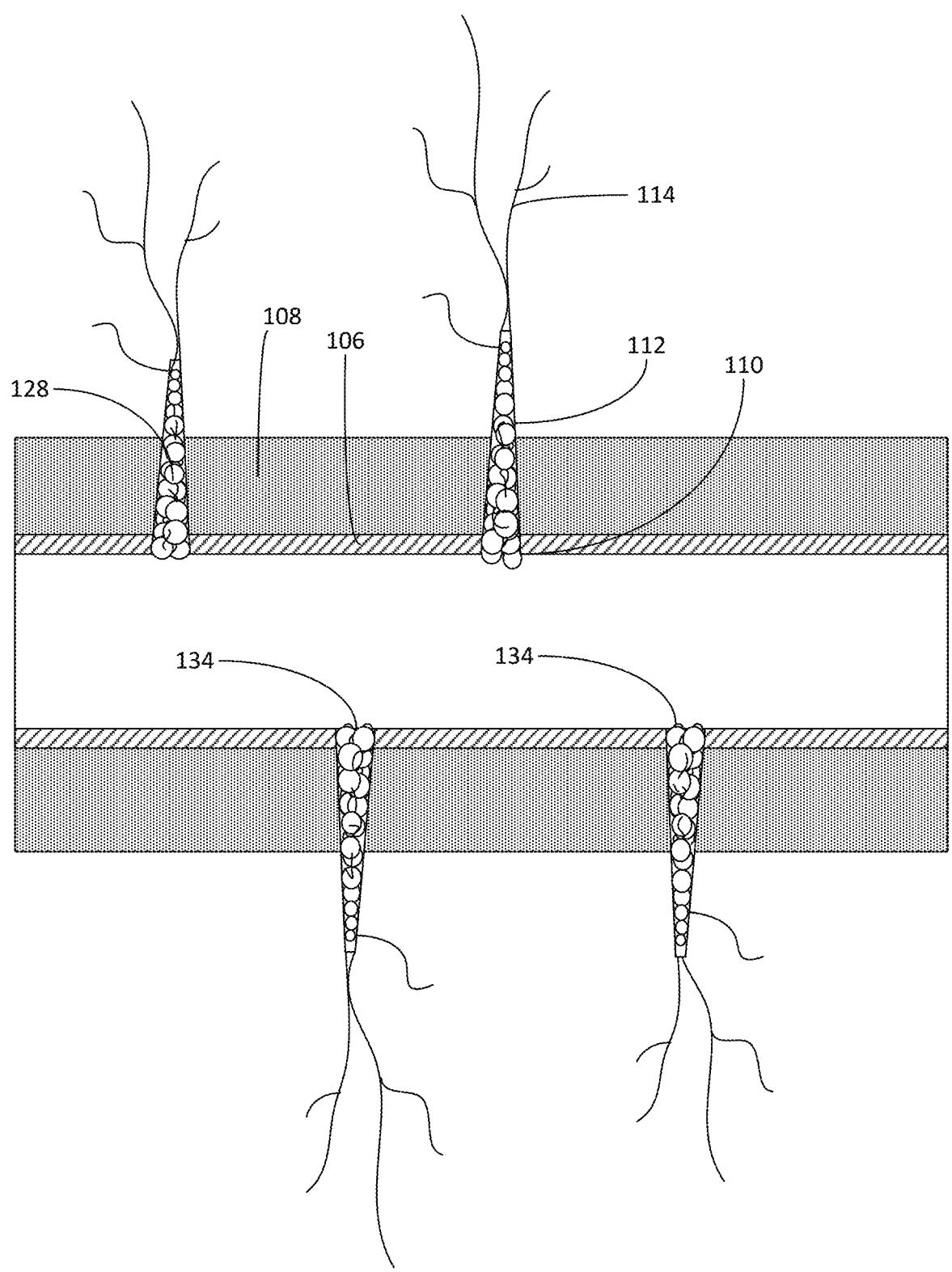
FIG. 3 is a close-up, cross-sectional view of the expanded elastomer material sealing the perforation tunnels and perforations.
Figure 4:
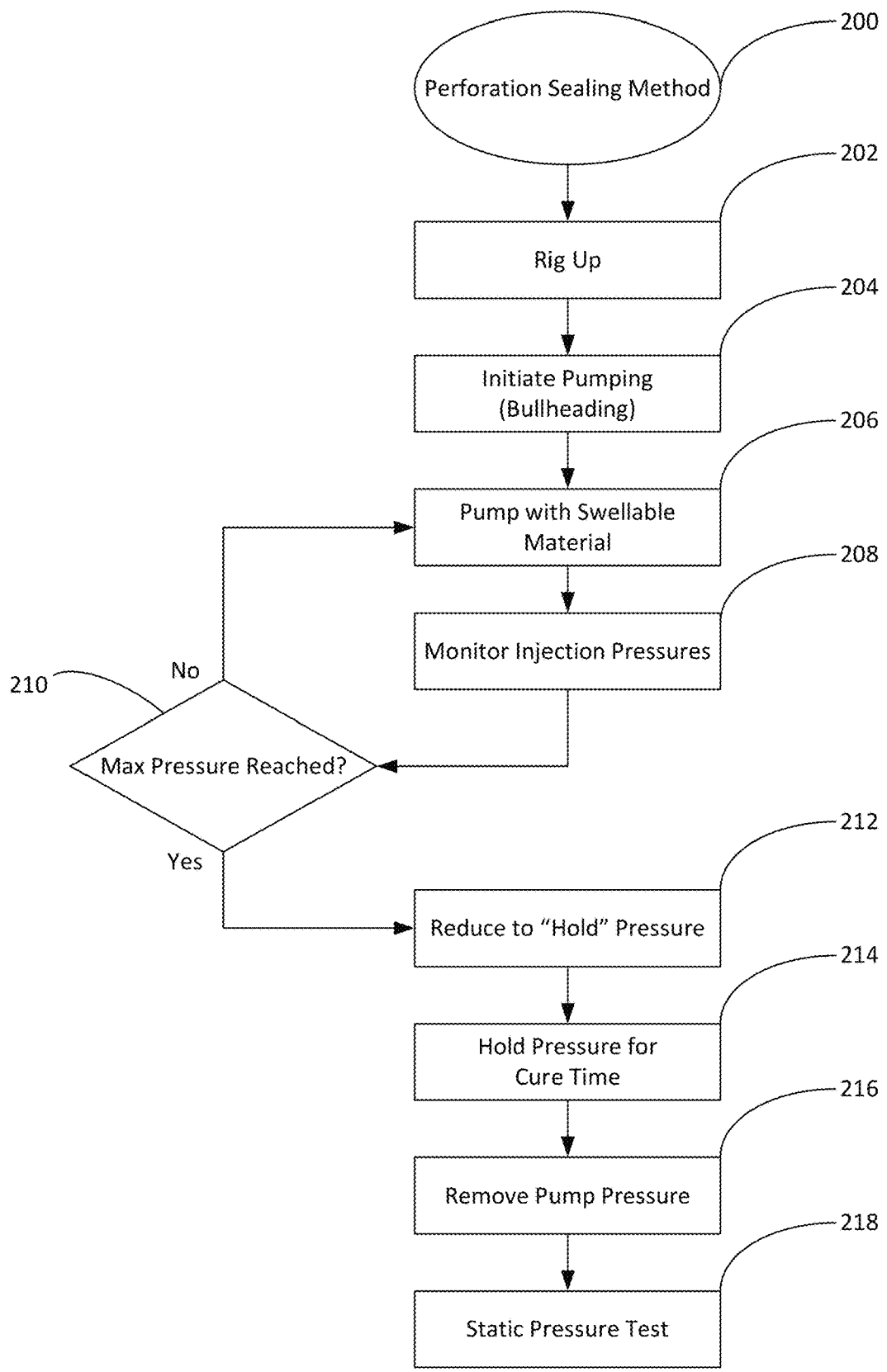
FIG. 4 is a process flow diagram for a perforation sealing method carried using the expandable elastomer material.

Turning to FIGS. 2 and 3, shown therein are cross-sectional, close-up views of a portion of the well 100. These figures illustrate the plugging effect achieved by placing the expandable material 128 into the perforations 110, perforation tunnels 112 and fractures 114. As shown in FIG. 2, the perforation sealing system 118 is used to push the mixture of carrier fluid and expandable material into the casing 106, where the mixture enters the formation 102 through the perforation tunnels 112 and fractures 114. As the mixture enters the perforation tunnels 112 and fractures 114, the expandable material 128 becomes trapped and accumulates in these relatively small voids. As shown in FIG. 4, the expandable material 128 then absorbs the surrounding carrier fluid or fluids in the well 100 and expands to fill the voids within the perforation tunnels 112 and larger fractures 114. The expandable material 128 forms a substantially impenetrable plug 134 that prevents the flow of fluid through the perforations 110 and perforation tunnels 112. As used herein, the term "mixture" includes, but is not limited to, slurries of expandable material in carrier fluid.

Turning to FIG. 4, shown therein is a process flow diagram for a perforation sealing method 200 that provides for emplacing the expandable material 128 into the perforation tunnels 112 to seal the perforations 110. The method 200 begins at step 202 as the perforation sealing system 118 is "rigged-up" on the well 100. Service crews arrive to the wellsite of a previously producing oil and gas well 100 that contains existing perforations in the wellbore 104. The crews rig up and prepare the necessary equipment, which may include some combination of the pump 120, the blender 122, the fluid source 124, and the expandable material hopper 126. High pressure pumping iron places the pump 120 in fluid communication with the wellhead 116. The expandable material 128 can be blended into the carrier fluid with the blender 122 or added using an injector or eductor into the high pressure fluid discharged from the pump 120.

At step 204, crews begin pumping the water or hydrocarbon-based carrier fluid into the well casing 106 to establish an injection rate and pressure. This is a commonly referred to process of "bullheading." A recommended pump rate of 4 to 8 barrels per minute (BPM) may be necessary for casing sizes ranging from 4.500" to 9.625" diameter. The step of bullheading the well 100 will continue until a desired volume of fluid has been pumped into the well 100. In some embodiments, the amount of fluid pumped into the well may range from about half to about twice the total casing volume.

Once a sufficient injection rate and pressure has been established, the expandable material 128 is added at step 206 to the output from the perforation sealing system 118. The expandable material may be added to the carrier fluid in ratios ranging from about 0.25 to about 1.0 pounds of expandable material per gallon of carrier fluid. Each perforation 110 may take between about 0.25 pounds and about 0.50 pounds of expandable material 128 before the perforation 110 is sealed. For example, if the well 100 has 100 perforations in the 5.500" diameter casing 106, the well 100 will need a minimum quantity of about 25 to about 50 pounds of expandable material 128 to occupy and seal all of the 100 perforation tunnels 112.

Next, at step 208, the perforation sealing system 118 continues to pump the slurry of carrier fluid and expandable material 128 into the well 100 while the pressures in the well 100 are closely monitored. As each perforation tunnel 112 begins to fill up with the expandable material 128, there will be slight increase in the pumping pressure. The pumping pressures will continue to rise as additional perforation tunnels 112 become occupied with the expandable material 128.

At step 210, the operator determines if the desired maximum pumping pressure has been reached. The maximum pressure may be indicated by the operator or when the rate of increase in the pumping pressure decreases to a threshold value. Once all the perforation tunnels 112 have been packed off with the expandable material 128 fluid losses through the well 100 will decrease and the pump rate will gradually be reduced at step 212 to a "hold" pressure that is maintained in the wellbore 104. A trapped hold pressure of between about 1,000 to about 3,000 pounds-per-square inch (psi) is recommended. As the expandable material 128 begins to swell and occupy the perforation tunnels 112, the pressures in the well 100 will begin to stabilize as fluid losses continue to decline. In exemplary embodiments, the pump 120 remains connected to the well 100 to maintain the hold pressure while this swelling process takes place.

It will be noted that the expandable material 128 is at first differentially held in place by applying positive pump pressure to the material. The hold pressure is held for a desired cure time at step 214. In some cases, a suitable pressurized cure time is between about 8 and about 12 hours. Once the expandable material has fully expanded, the hold pressure can be bled off the well 100. At step 216, the pump pressure is removed following the pressurized cure time and the perforation sealing system 118 can be disconnected from the wellhead 116. During this time, the well 100 is kept under pressure, but the pump 120 is no longer needed to maintain the pressure in the well 100.

Once the pump pressure has been removed, a static pressure test can optionally be performed on the well 100 at step 218. In exemplary embodiments, the static pressure test is run for from about 50 to about 100 hours, with a preferred test time of about 72 hours to allow the expandable material sufficient time to swell out and fully seal off the occupied perforation tunnels 112. During the static pressure test, the expandable material 128 fully expands and forms the plugs 134 to seal the perforations 110 and perforation tunnels 112. The perforation plugs 134 will create an effective seal against the formation fracture matrix as well as seal off any existing fractures 114 that have been created in the cement 108 behind the production casing 106.

Following the static pressure test, the operator can slowly bleed off the trapped static pressure within the well 100. The well 100 is now in a state to allow the producer to re-perforate and stimulate this well 100. The target of the new perforations will be the space and distance between the existing perforations 110 that have been effectively plugged off with the expandable material 128.

Although the inventive systems and methods are well suited for preparing the well 100 for a subsequent hydraulic fracturing operation, it will be appreciated that the expandable material 128 and method 200 will find utility in other applications. For example, the embodiments disclosed herein are also helpful in limiting the migration of hydraulic fracturing fluid along the outside of the casing 106 caused by compromised cement 108 around the casing 106. By sealing the perforation tunnels 112, hydraulic fracturing fluid is prevented from migrating through cracks or fissures in the cement 108.

In other embodiments, the expandable material 128 is pumped into the well 100 in preparation for abandoning the well 100. In many wells designated for "plugging" or abandonment, there is insufficient bottom-hole pressure to allow circulating fluids and cement to plug the well. The expandable material 128 can be pushed into the well 100 using the perforation sealing method 200 to provide a cost effective method of plugging the well 100 for abandonment.

In yet other embodiments, the expandable material 128 can be used to provide zonal control for wells in which the casing 106 has been parted. In a modification to the perforation sealing method 200, the expandable material 128 can be pumped behind the parted casing to create an effective barrier for well control and zonal isolation purposes.

It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms expressed herein. It will be appreciated by those skilled in the art that the teachings of the present invention can be applied to other systems without departing from the scope and spirit of the present invention.

It is claimed:

1. A method for sealing perforation tunnels in a well, the method comprising the steps of:
   pumping an initial volume of fluid into the well;
   mixing expandable material into a carrier fluid to form an expandable fluid mixture;
   pumping the expandable fluid mixture into the well to force the expandable material into the perforation tunnels in the well; and
   holding the expandable material under a hold pressure of from about 1,000 psi to about 3,000 psi in the perforation tunnels for a cure period to form perforation plugs.

2. The method of claim 1, further comprising a step of performing a static pressure test after the step of holding the expandable material under a hold pressure.

3. The method of claim 2, further comprising a step of removing pressure from the well after the step of performing a static pressure test.

4. The method of claim 1, wherein the step of mixing expandable material into a carrier fluid further comprises mixing hydrophilic granules into a water-based carrier fluid.

5. The method of claim 1, wherein the step of mixing expandable material into a carrier fluid further comprises mixing swellable fibers into a water-based carrier fluid.

6. The method of claim 1, wherein the step of mixing expandable material into a carrier fluid further comprises mixing a combination of hydrophilic granules and swellable fibers into a water-based carrier fluid.

7. The method of claim 1, wherein the step of mixing expandable material into a carrier fluid further comprises mixing an expandable material selected from the group consisting of natural rubber, isoprene rubber, butadiene rubber and chloroprene.

8. The method of claim 1, wherein the step of mixing expandable material into a carrier fluid further comprises mixing an expandable material selected from the group consisting of nitrile rubber, EPDM rubber, and ethylene acrylic rubber, chlorohydrin rubber.

9. The method of claim 1, wherein the step of mixing expandable material into a carrier fluid further comprises mixing an expandable material selected from the group consisting of chlorosulfonated polyethylene, acrylate rubber, fluor rubber and silicone rubber.

10. The method of claim 1, wherein the step of mixing expandable material into a carrier fluid further comprises mixing an expandable material that dissolves in the presence of acid.

11. A method for sealing perforation tunnels in a well, the method comprising the steps of:
pumping an initial volume of fluid into the well;
mixing expandable material into a carrier fluid to form an expandable fluid mixture;
pumping the expandable fluid mixture into the well to force the expandable material into the perforation tunnels in the well;
holding the expandable material under a hold pressure of from about 1,000 psi to about 3,000 psi in the perforation tunnels for a cure period to form perforation plugs; and
performing a static pressure test after the step of holding the expandable material under a hold pressure.

12. The method of claim 11, further comprising a step of removing pressure from the well after the step of performing a static pressure test.

13. The method of claim 11, wherein the step of mixing expandable material into a carrier fluid further comprises mixing hydrophilic granules into a water-based carrier fluid.

14. The method of claim 11, wherein the step of mixing expandable material into a carrier fluid further comprises mixing swellable fibers into a water-based carrier fluid.

15. The method of claim 11, wherein the step of mixing expandable material into a carrier fluid further comprises mixing a combination of hydrophilic granules and swellable fibers into a water-based carrier fluid.

16. A method for sealing perforation tunnels in a well, the method comprising the steps of:
pumping an initial volume of fluid into the well;
mixing expandable material into a carrier fluid to form an expandable fluid mixture, wherein the step of mixing expandable material into a carrier fluid further comprises mixing a combination of hydrophilic granules and swellable fibers into the water-based carrier fluid;
pumping the expandable fluid mixture into the well to force the expandable material into the perforation tunnels in the well; and
holding the expandable material under a hold pressure of from about 1,000 psi to about 3,000 psi in the perforation tunnels for a cure period to form perforation plugs.

17. The method of claim 16, further comprising a step of performing a static pressure test after the step of holding the expandable material under a hold pressure.

18. The method of claim 17, further comprising a step of removing pressure from the well after the step of performing a static pressure test.

* * * * *